(12) United States Patent
Kishimoto et al.

(10) Patent No.: US 7,258,955 B2
(45) Date of Patent: Aug. 21, 2007

(54) COLOR FILTER SUBSTRATE, COLOR FILTER SUBSTRATE MANUFACTURING METHOD, AND COLOR FILTER SUBSTRATE MANUFACTURING DEVICE

(75) Inventors: Satoru Kishimoto, Tenri (JP); Keiichi Tanaka, Tenri (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 585 days.

(21) Appl. No.: 10/784,651

(22) Filed: Feb. 24, 2004

(65) Prior Publication Data

US 2004/0166423 A1 Aug. 26, 2004

(30) Foreign Application Priority Data

Feb. 25, 2003 (JP) ............................. 2003-048092

(51) Int. Cl.
*G02B 5/20* (2006.01)
(52) U.S. Cl. .......................................... 430/7; 427/164
(58) Field of Classification Search ...................... None
See application file for complete search history.

(56) References Cited

U.S. PATENT DOCUMENTS 6,134,059 A * 10/2000 Shirota et al. .............. 359/891
6,399,257 B1 * 6/2002 Shirota et al. ................ 430/7
6,766,817 B2    7/2004 da Silva

FOREIGN PATENT DOCUMENTS

JP      5-142407 A  *  6/1993
JP    2000-258622 A     9/2000

* cited by examiner

*Primary Examiner*—John A. McPherson
(74) *Attorney, Agent, or Firm*—Birch, Stewart, Kolasch & Birch LLP

(57) ABSTRACT

A high-quality color filter substrate is manufactured simply and at low cost by using a color filter substrate manufacturing method of applying a coloring liquid to a substrate surface of a translucent substrate so as to form at least colored layer, including: contacting step of causing a coloring liquid supplied from a coloring liquid supplying section to bring into contact with areas showing lyophilic property to the coloring liquid and areas showing lyophobic property to the coloring liquid, both of the areas being formed on the substrate surface; and applying step of, after the contacting step, causing relative movement between the coloring liquid supplying section and the translucent substrate while continuously supplying a coloring liquid from the coloring liquid supplying section.

17 Claims, 8 Drawing Sheets

COLOR FILTER SUBSTRATE, COLOR FILTER SUBSTRATE MANUFACTURING METHOD, AND COLOR FILTER SUBSTRATE MANUFACTURING DEVICE

This Nonprovisional application claims priority under 35 U.S.C. § 119(a) on Patent Application No. 2003/48092 filed in Japan on Feb. 25, 2003, the entire contents of which are hereby incorporated by reference.

FIELD OF THE INVENTION

The present invention relates to a color filter substrate for use in a liquid crystal display device, for example, and a color filter substrate manufacturing method.

BACKGROUND OF THE INVENTION

In recent years, application of a liquid crystal device to personal computers, portable information terminals, portable telephones, television sets, and others has been rapidly developed. For each of the liquid crystal devices, a color filter substrate is used to respond to a color display and generally forms a pattern of light's three primary colors of red (R), green (G), and blue (B).

One conventional color filter substrate manufacturing method is a pigment dispersion method of forming a pattern of colored layers by applying a color resist onto a transparent substrate and subjecting the transparent substrate to exposure and development. According to this method, a photosensitive resin layer containing a pigment dispersed therein is first formed on a substrate, and a colored layer of a single color is then obtained by patterning the photosensitive resin layer. By repeating the above process three times, a pattern of colored layers of R, G, and B is formed.

Another conventional color filter substrate manufacturing method is a dyeing method of forming colored layers by applying a dyeing base material onto a transparent substrate and dying colored layers formed by exposure and development. According to this method, a water-soluble polymeric material is first applied as a dyeing material to the surface of a glass substrate. The applied polymeric material is patterned into the desired form by photolithography. The resulting pattern is immersed in a dyeing bath to obtain a colored pattern. By repeating the above process three times, a pattern of colored layers of R (red), G (green), and B (blue) is formed.

However, these methods need to repeat cleaning step, applying step, exposing step, developing step for each color, resulting in difficulty in simplification of the manufacturing process. Moreover, in the applying step, there is the problem of increase in material loss due to spin coating method. Still another methods are electrodeposition method of forming a transparent electrode on a transparent substrate by patterning and passing electric current through the transparent electrode in electrolytic solution of each color, thereby electrodepositing, and printing method of printing each color on a transparent substrate to form colored layers. However, there are the problems that pattern shapes capable of being formed by the electrodeposition method are limited, and a fine pitch pattern is difficult to be formed by the printing method.

On the other hand, an ink jet technique of discharging an ink at a predetermined position while moving an ink jet head to directly form colored layers is currently paid attention because the ink jet technique enables a cost reduction due to reduction in the amount of ink used and simplification in manufacturing process.

In the ink jet technique, it is possible to form an accurate pattern of colored layers when an ink is discharged by forming patterns of hydrophilic areas and hydrophobic areas on a glass substrate as pretreatment.

In this connection, patent document 1 (Japanese Laid-Open Patent Application No. 2000/258622 (Tokukai 2000-258622; published on Sep. 22, 2000)) discloses a method of forming hydrophobic patterns and hydrophilic patterns by exposing a photosensitive layer to light for patterning. That is, when light is irradiated to the photosensitive layer formed consisting of a photosensitive compound such as $Ti_3O$ and $SnO_2$, electrons and holes excited and generated upon irradiation of light react with oxygen and water, which are absorbed on the surface of the photosensitive compound, to form active oxygen, whereby the surface of the photosensitive layer subjected to the irradiation of light becomes hydrophilic. Here, the photosensitive compound ($Ti_3O$, $SnO_2$, and the like), which is metal oxide, inherently has hydrophobic and liophobic property, and an area on the photosensitive layer not subjected to the irradiation of light therefore shows hydrophilic property. Accordingly, when an ink is discharged to a predetermined area showing hydrophilic property with the ink jet technique, it is possible to prevent color mixing between the colored layers caused by blur of the ink and others).

Such an ink jet technique used in the patent document 1 has the drawback that a ink discharge position must be controlled with a high degree of accuracy because the ink jet technique needs to discharge an ink to a predetermined position. A shifted ink discharge position causes color mixing between the colored layers and uncolored dots in the colored layers.

Further, the ink jet technique has the drawback that ink intermittent discharge must be highly controlled because the ink jet technique needs to discharge a predetermined amount of ink at predetermined intervals. Unstable intermittent discharge causes color unevenness in the color layers. In addition, the ink jet technique has the problem of a plugged ink jet nozzle.

As described above, manufacturing of a high-quality color filter substrate with the conventional technique requires a cumbersome manufacturing process and an expensive manufacturing device which can realize a highly controlled ink discharge. Treatment in the cumbersome manufacturing process and use of the expensive manufacturing device results in increase in manufacturing cost and rise in price of a color filter substrate itself manufactured.

SUMMARY OF THE INVENTION

The present invention has been attained in view of the above problems, and a feature of the present invention is to provide a simple and low-cost manufacturing method for manufacturing a high-quality color filter substrate, and to provide an inexpensive and high-quality color filter substrate.

In order to achieve the above feature, a color filter substrate manufacturing method of the present invention is a color filter substrate manufacturing method of applying a coloring liquid to a substrate surface of a translucent substrate so as to form at least one colored layer, includes: contacting step of causing a coloring liquid supplied from a coloring liquid supplying section to bring into contact with areas showing lyophilic property to the coloring liquid and areas showing lyophobic property to the coloring liquid, the lyophilic areas and the lyophobic areas being formed on the substrate surface; and applying step of, after the contacting step, causing relative movement between the coloring liquid supplying section and the translucent substrate while continuously supplying a coloring liquid from the coloring liquid supplying section.

The above method is a method in which the coloring liquid is applied to the areas showing lyophilic property to the coloring liquid (hereinafter referred to as hydrophilic areas) and the areas showing lyophobic property to the coloring liquid (hereinafter referred to as hydrophobic areas), both of which are formed on the substrate surface, while the coloring liquid brings into contact with the both areas, that is, the coloring liquid is directly applied to the both areas (Note that, lyophilic property indicates, for example, hydrophilic property and lipophilic property, and lyophobic property indicates, for example, hydrophobic property and lipophobic property).

That is, in the contacting step, when the coloring liquid is brought into contact with the substrate surface on which the lyophilic areas and the lyophobic areas are formed, the coloring liquid in contact with the lyophobic areas becomes in a repelled state on the surface of the lyophobic areas. On the other hand, the coloring liquid in contact with the lyophilic areas becomes in an adhered state to the surface of the lyophilic areas. In this state, in the applying step, relative movement is caused between the substrate surface and the coloring liquid supplying section while continuously supplying the coloring liquid from the coloring liquid supplying section. As a result of this, the coloring liquid supplied from the coloring liquid supplying section can be continuously applied only to the lyophilic areas.

Thus, in the above method, since the coloring liquid is applied to the substrate surface with the coloring liquid in contact with the substrate surface, it is not necessary to position areas where the coloring liquid is to be applied. Further, since the coloring liquid is continuously supplied from the coloring liquid supplying section, unlike the ink jet technique, it is not necessary to control intermittent discharge of ink. This eliminates the need for a cumbersome manufacturing process and such an expensive manufacturing device as a device using the ink-jet technique.

This makes it possible to manufacture a color filter substrate simply and at low cost.

Moreover, since the coloring liquid is applied to the substrate surface (more precisely, the lyophilic areas to be colored) while the coloring liquid is continuously brought into contact with the substrate surface, that is, the coloring liquid is directly applied to the substrate surface, the possibility that color unevenness and uncolored dots might occur in the colored layer is reduced, as compared to the ink jet technique of coloring like pointillism (application of a coloring liquid).

This realizes a high-quality color filter substrate to be manufactured. Moreover, this realizes reduction in the amount of coloring liquid used, as compared to the ink jet technique, thus reducing manufacturing costs.

For a fuller understanding of the nature and advantages of the invention, reference should be made to the ensuing detailed description taken in conjunction with the accompanying drawings.

DESCRIPTION OF THE EMBODIMENTS

The following will describe one embodiment of the present invention.

Figure 4:
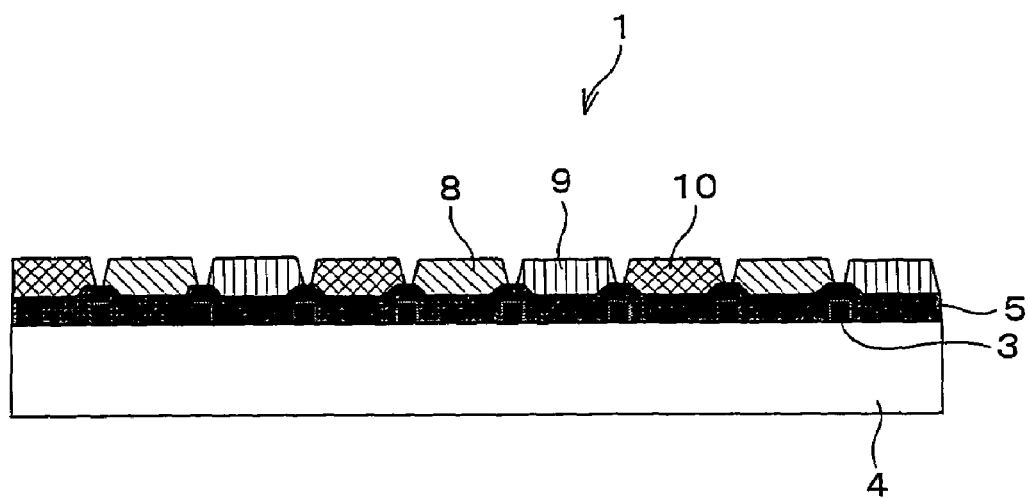
FIG. 4 is a cross-sectional view of a color filter substrate fabricated in the manufacturing method of the present invention.

FIG. 4 is a cross-sectional view of a color filter substrate 1 in the present invention. As shown in FIG. 4, a color filter substrate 1 manufactured by a manufacturing method of the present invention has a structure in which a black matrix 3 and a photocatalyst containing layer 5 are formed on (a surface of) a glass layers 8 (R), second colored layers 9 (G), and third colored layers 10 (B) are formed on (a substrate surface of) the photocatalyst containing layer 5. Here, the black matrix 3 is a light shielding layer between the colored layers.

Next, a principle of manufacturing method of the color filter substrate 1 will be described with reference to FIGS. 1(a)-(c), FIGS. 2(a)-(b), and FIG. 4. Here, FIGS. 1(a)-(c) show contacting step and applying step in the present invention, and FIGS. 2(a)-(b) show a structure of an application device (coloring liquid supplying device) 11 used for the manufacturing method of the color filter substrate 1 in the present invention.

In the first step, the photocatalyst containing layer 5 (substrate surface) showing hydrophobic property (lyophobic property) to a coloring liquid 2 is provided on the surface of the translucent substrate 4. Then, in the second step (patterning step), line-shaped hydrophilic areas (lyophilic areas) 6 showing hydrophilic property (lyophilic property) to the coloring liquid 2 are formed on the photocatalyst containing layer 5, which has been formed in the first step. Next, in the third step (contacting step and applying step), the coloring liquid 2 is applied to the hydrophilic areas 6 while the coloring liquid 2 is brought into contact with the photocatalyst containing layer 5.

The detailed description of the third step will be given below.

In the third step, as shown in FIG. 1(a), a nozzle end 24 (nozzle orifice forming a groove shape) of a nozzle (coloring liquid supplying section) 22 provided to the application device 11 is brought near predetermined positions (top ends) 7 of the hydrophilic areas 6 in the photocatalyst containing layer 5, and the coloring liquid 2 raised by the surface tension (exposed from the nozzle end 24 to the outside of the nozzle 22) is brought into contact with the predetermined positions 7. At this moment, the coloring liquid 2 in contact with areas (hydrophobic areas) other than the hydrophilic areas 6 is in a repelled state on the surfaces of the hydrophobic areas.

Then, in this state, as shown in FIG. 1(b), the nozzle end 24 is moved a certain distance (a predetermined distance) downward so that the nozzle end 24 and the photocatalyst containing layer 5 are kept apart (separated) by a certain distance, and the coloring liquid 2 sags from the predetermined positions (top ends) 7. Then, the coloring liquid 2 in contact with the hydrophobic areas is completely separated from the surfaces of the hydrophobic areas and stays away from the photocatalyst containing layer 5. On the other hand, the coloring liquid 2 in contact with the hydrophilic areas 6 sags by surface tension while being in contact with (being adhered to) the hydrophilic areas 6, which causes the nozzle end 24 and the hydrophilic areas 6 (areas to be colored) on the photocatalyst containing layer 5 to be in a state connected with each other via the coloring liquid 2, with a certain distance maintained.

Further, with this state maintained, as shown in FIG. 1(c), the nozzle end 24 or the translucent substrate 4 is moved in parallel (relative movement) with the hydrophilic areas 6. This causes the coloring liquid 2 to be applied only to hydrophilic areas to be colored (hydrophilic areas 6) on the photocatalyst containing layer 5 which is formed on the translucent substrate 4.

Thereafter, firing step for firing the coloring liquid 2 applied to the hydrophilic areas 6 is performed. This forms colored layers showing one color. By repeating the second step, the third step, and the firing step three times, three types of colored layers respectively showing red (R), green (G), and blue (B) can be formed.

The following will describe the application device 11 used for the manufacturing method of the color filter substrate 1 with reference to FIGS. 1(a)-(c) and FIGS. 2(a)-(b).

As shown in FIG. 2(a), the application device 11 has a liquid tank 21 for storing the coloring liquid 2, a supply pipe 25, and a nozzle 22. The nozzle 22, as shown in FIG. 1(a), is shaped like a triangle pole set on its side and has a very small spacing 23 sandwiched between plane surfaces which are substantially vertical to the hydrophilic areas 6. This spacing 23 is a space where the coloring liquid 2 penetrates. Note that, as shown in FIG. 2(a), as the application device 11 is seen from a longitudinal cross section, the spacing 23 of the nozzle 22 is shaped like a capillary.

Capillary phenomenon causes the coloring liquid 2 to penetrate the spacing (shaped like a capillary) 23 of the nozzle 22 from the liquid tank 21 via the supply pipe 25, and the coloring liquid 2 is supplied to the nozzle end (coloring liquid supply port) 24. The coloring liquid 2 supplied to the nozzle end 24 becomes in a raised state by surface tension (exposed from the nozzle end 24 to the outside of the nozzle 22). In this state, the coloring liquid 2 is brought into contact with the photocatalyst containing layer 5 and applied to the photocatalyst containing layer 5.

Referring to FIGS. 1(a)-(c), FIGS. 3(a)-(d), and FIGS. 5(a)-(g), the following will describe a manufacturing method of the color filter substrate 1 in the present embodiment.

FIGS. 3(a)-(d) show a step of applying a coloring liquid in the present embodiment. FIGS. 5(a)-(g) show a step of forming colored layers in the present embodiment.

The photocatalyst containing layer 5 is first formed on the glass substrate 4 (on this glass substrate 4, the black matrix 3 is patterned into a line form) by the following method.

A dispersion liquid of anatase-type titanium oxide fine particles and fluoroalkylsilane are synthesized by hydrolytic degradation and condensation reaction to generate a coating including anatase-type titanium oxide dispersed in a solvent. Then, the glass substrate 4 is coated with this coating of 0.1 µm in thickness by a spin coating method. Thereafter, the coating coated on the glass substrate 4 is dried at 200° C. for 10 minutes to cure the coating. This forms the photocatalyst containing layer 5 on the glass substrate 4 (FIG. 5(a)).

Next, as shown in FIG. 5(b), the photocatalyst containing layer 5 is subjected to ultraviolet irradiation via a photomask 12a to form hydrophilic areas 6a including locations where the first colored layers 8 are formed, as shown in FIG. 3(a).

Note that, the photomask 12a is patterned so that ultraviolet rays are irradiated to the hydrophilic areas 6a. This forms the surface of the photocatalyst containing layer 5 structured by the line-shaped hydrophilic areas 6a and hydrophobic areas.

Then, the colored layers 8 of red (R) are formed by the following method.

Using the application device 11 (see FIG. 2(a)), a coloring liquid 2a (color resist including red (R) pigments in dispersion) is applied to the hydrophilic areas 6a.

That is, in the first step, the coloring liquid 2a is supplied (led) by capillary phenomenon from the liquid tank 21 to the nozzle end 24 through the supply pipe 25, and the coloring liquid 2a raised by surface tension (exposed to the outside of the nozzle 22) is brought into contact with the ends of the hydrophilic areas 6a (FIG. 1(a)). In the state as shown in FIG. 3(a), the nozzle end 24 (liquid-contacting position) is at a position denoted by 7a. At this moment, the coloring liquid 2a in contact with the hydrophobic areas is repelled on their surfaces.

In the next step, as shown in FIG. 1(b), the nozzle 22 is moved downward so that a certain distance is kept between the nozzle end 24 and the photocatalyst containing layer 5. This causes a coloring liquid bringing into contact with the hydrophobic areas to be completely separated from the surfaces of the hydrophobic areas and to stay away from the photocatalyst containing layer 5. On the other hand, the coloring liquid 2a adhered to the hydrophilic areas 6a sags by surface tension while bringing into contact with the photocatalyst containing layer 5, which causes the nozzle end 24 and the areas showing hydrophilic property on the photocatalyst containing layer 5 to be in a state connected with each other via the coloring liquid 2a, with a certain distance maintained.

In the further next step, as shown in FIG. 1(c), while the nozzle end 24 and the coloring liquid 2a are kept in the above state, the nozzle end 24 or the glass substrate 4 is moved in parallel. This causes the coloring liquid 2a to be applied only to the hydrophilic areas 6a on the photocatalyst containing layer 5 formed on the glass substrate 4.

As described above, the coloring liquid 2a (color resist including red (R) pigments in dispersion) of 1 µm in thickness is applied to the hydrophilic areas 6a. Thereafter, the coloring liquid 2a applied to the hydrophilic areas 6a is fired at 200° C. for 30 minutes. This forms the first colored layers 8 of Red (R) (FIG. 5(c)).

Next, as shown in FIG. 5(d), the photocatalyst containing layer 5 is subjected to ultraviolet irradiation via a photomask 12b to form hydrophilic areas 6b including locations where the second colored layers 9 are formed. Note that, the photomask 12b is patterned into a line form so that ultraviolet rays are irradiated to the hydrophilic areas 6b (areas surrounded by dashed lines in FIG. 3(b)). This forms the line-shaped hydrophilic areas 6b on (the surface of) the photocatalyst containing layer 5.

Figure 3:
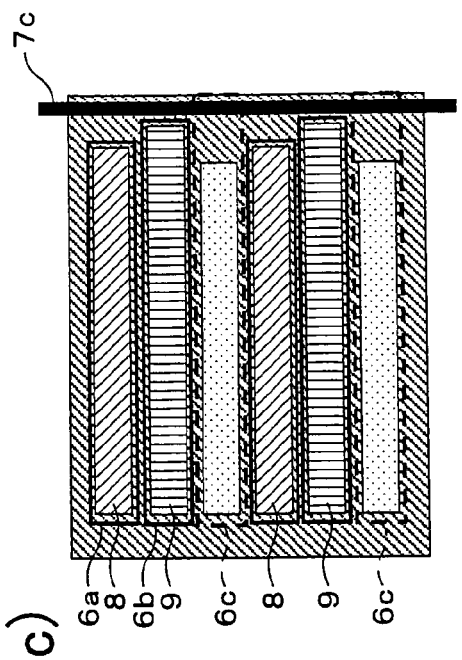
FIGS. 3(a)-(d) are process drawings illustrating an applying method of a coloring liquid in the present invention, using plane views of a photocatalyst containing layer.
Figure 3:
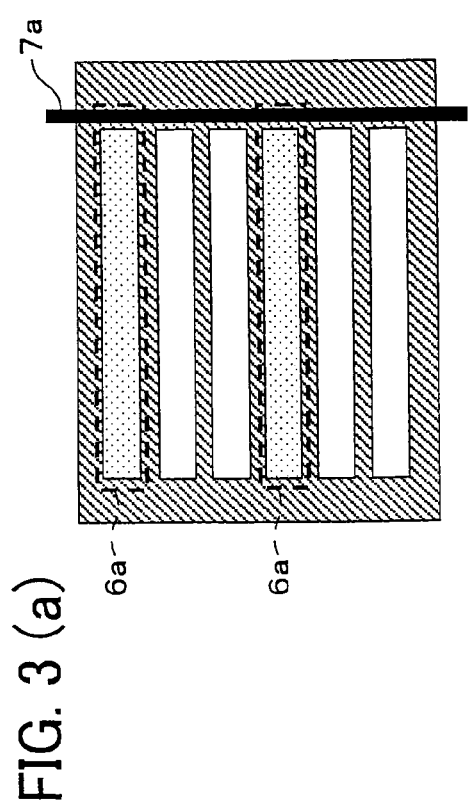
Figure 3:
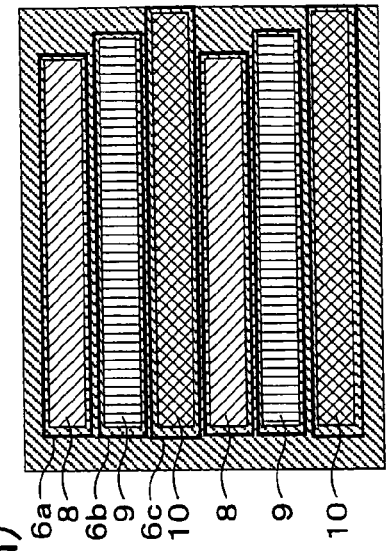
Figure 3:
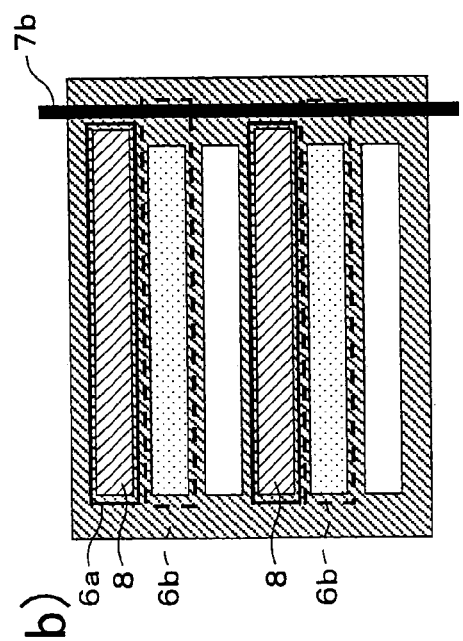

Here, the line-shaped hydrophilic areas 6b are so formed that their top ends are shifted more in a top end direction, as compared to the top ends of the hydrophilic areas 6a (see FIG. 3(*a*)).

Note that, one end of the line-shaped hydrophilic areas 6a-6c each (on the right side in the drawing) is referred to as top end. The direction from the center of the glass substrate 4 to the top end is referred to as top end direction. The other end of the hydrophilic areas 6a-6c each (on the left side in the drawing) is referred to as bottom end. The direction from the center of the glass substrate 4 to the bottom end is referred to as bottom end direction.

Figure 1:
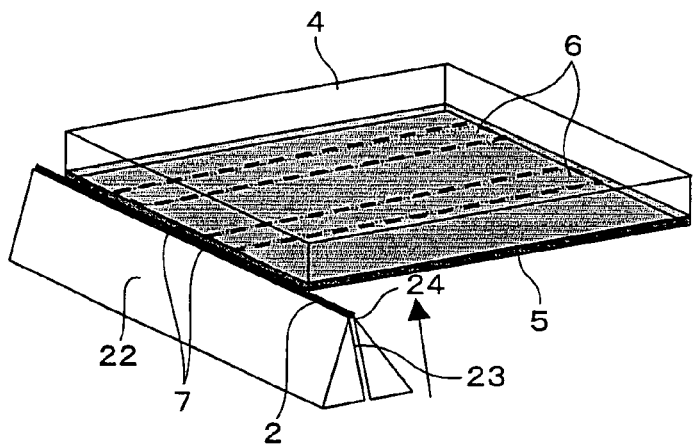
FIGS. 1(a)-(c) are process drawings illustrating an application technique of a coloring liquid in the present invention.
Figure 1:
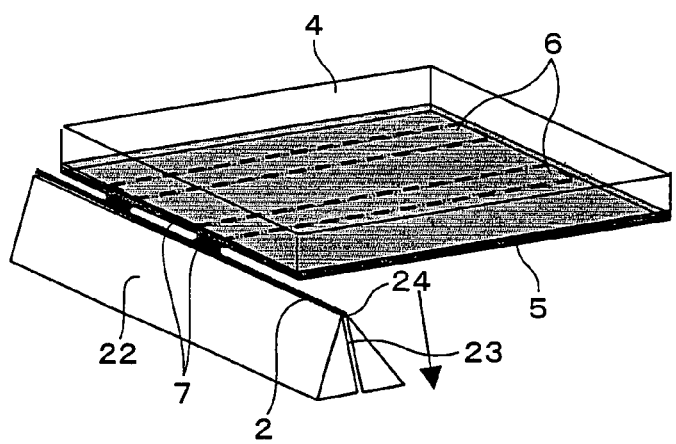
Figure 1:
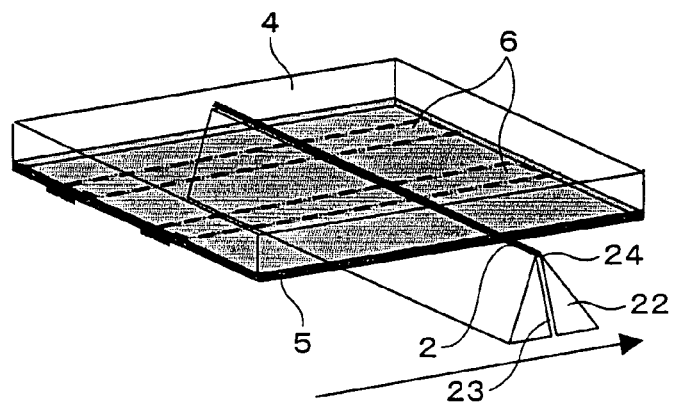
Figure 2:
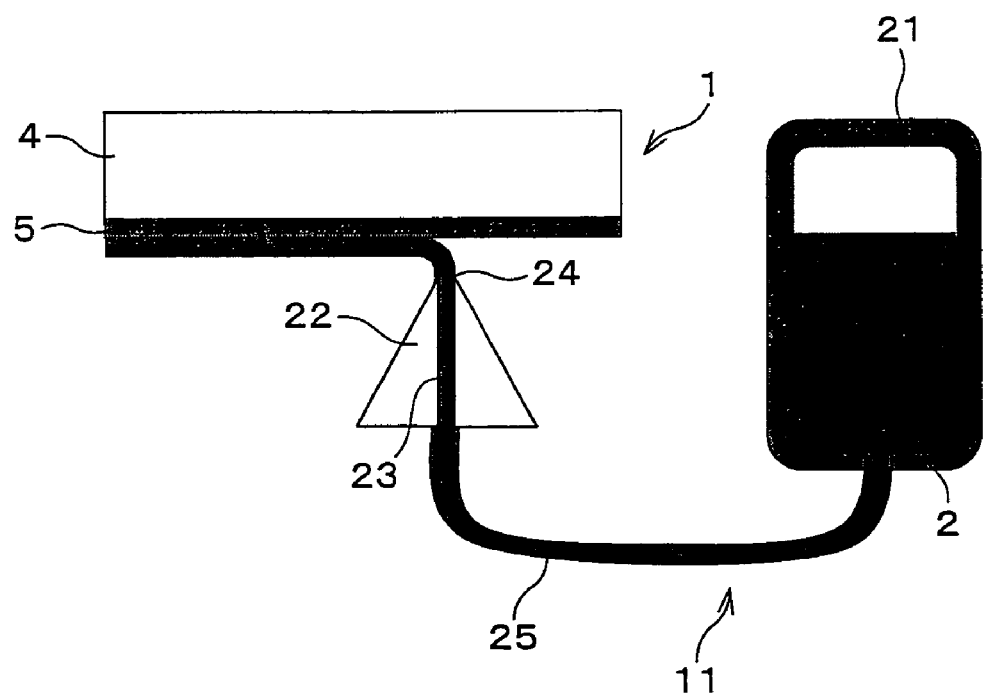
FIG. 2(a) and FIG. 2(b) are cross-sectional views showing the arrangement of an application device used in a color filter substrate manufacturing method of the present invention.
Figure 2:
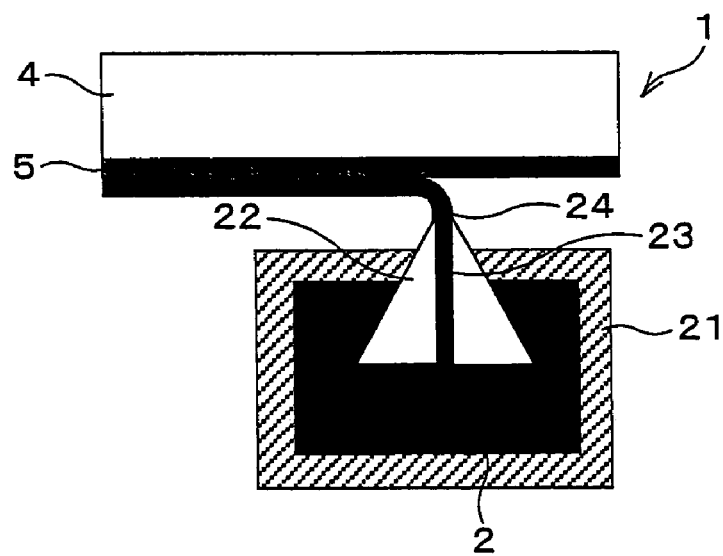

Next, as in the case when the first colored layers 8 are formed, using the application device shown in FIG. 2(*a*) and the applying method shown in FIGS. 1(*a*)-(*c*), a coloring liquid 2b (color resist including green (G) pigments in dispersion) of 1 μm in thickness is applied only to the hydrophilic areas 6b. Here, when the nozzle end 24 is brought into contact with the ends of the hydrophilic areas 6b (see FIG. 1(*a*)), the nozzle end 24 is at a position denoted by 7b in FIG. 3(*b*), that is, at the top end of the hydrophilic area 6b. Here, the top end (7b) of the hydrophilic area 6b is shifted in the top end direction more than the top end (7a) of the hydrophilic area 6a (see FIG. 3(*a*)). Therefore, when the nozzle end 24 is located at this position, a raised surface of the coloring liquid 2b is brought into contact with the photocatalyst containing layer 5, and the nozzle end 24 and the photocatalyst containing layer 5 are separated by a predetermined distance, the surface of the coloring liquid 2b brings into contact with the hydrophilic areas 6b only. This avoids the coloring liquid 2b from being adhered to the already-formed colored layers 8, thus preventing color mixing of the colored layer 8 and the colored layer 9 (coloring liquid 2b).

As described above, the coloring liquid 2b of 1 μm in thickness is applied to the hydrophilic areas 6b. Thereafter, the coloring liquid 2b applied to the hydrophilic areas 6b is fired at 200° C. for 30 minutes. This forms the second colored layers 9 of green (G) (FIG. 5(*e*)).

Figure 5:
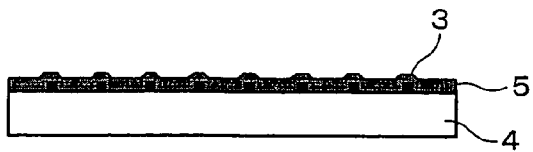
FIGS. 5(a)-(g) are process drawings illustrating a forming method of a colored layer in an embodiment of the present invention.
Figure 5:
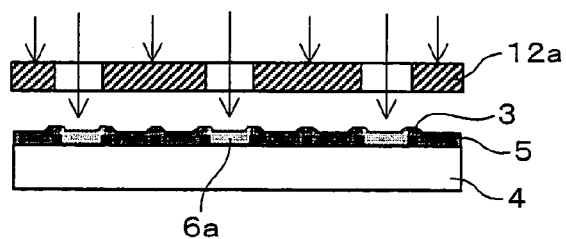
Figure 5:
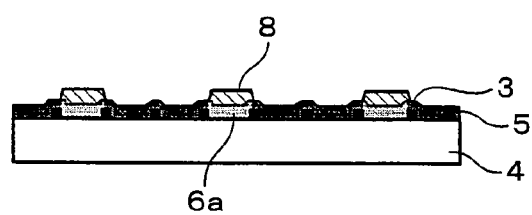
Figure 5:
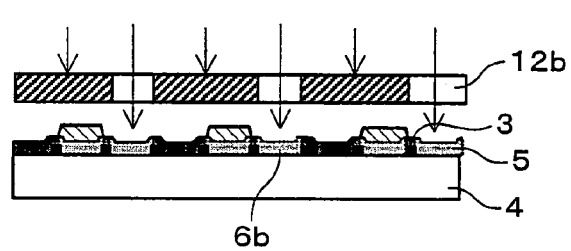
Figure 5:
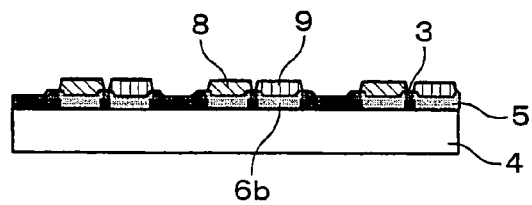
Figure 5:
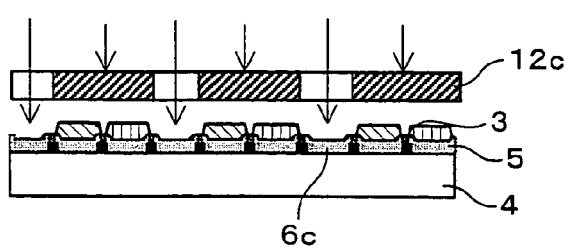
Figure 5:
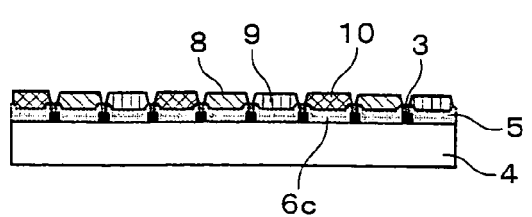

Next, as shown in FIG. 5(*f*), the photocatalyst containing layer 5 is subjected to ultraviolet irradiation via a photomask 12c to form hydrophilic areas 6c including locations where the third colored layers 10 are formed. Note that, the photomask 12c is patterned into a line form so that ultraviolet rays are irradiated to the hydrophilic areas 6c (areas surrounded by dashed lines in FIG. 3(*c*)). This forms the line-shaped hydrophilic areas 6c on the photocatalyst containing layer 5.

Here, the line-shaped hydrophilic areas 6c are so formed that their top ends are shifted more in a top end direction, as compared to the top ends of the hydrophilic areas 6b (see FIG. 3(*b*)).

Next, as in the case when the first colored layers 8 and the second colored layers 9 are formed, using the application device shown in FIG. 2(*a*) and the applying method shown in FIGS. 1(*a*)-(*c*), a coloring liquid 2c (color resist including blue (B) pigments in dispersion) of 1 μm in thickness is applied only to the hydrophilic areas 6c. Here, when the nozzle end 24 is brought into contact with the ends of the hydrophilic areas 6c (see FIG. 1(*a*)), the nozzle end 24 is at a position denoted by 7c in FIG. 3(*c*), that is, at the top end of the hydrophilic area 6c. Here, the top end (7c) of the hydrophilic area 6c is shifted in the top end direction more than the top end (7b) of the hydrophilic area 6b (see FIG. 3(*b*)). Therefore, when the nozzle end 24 is located at this position, and a raised surface of the coloring liquid 2c is brought into contact with the photocatalyst containing layer 5, and the nozzle end 24 and the photocatalyst containing layer 5 are separated by a predetermined distance, the surface of the coloring liquid 2c brings into contact with the hydrophilic areas 6c only. This avoids the coloring liquid 2c from being adhered to the already-formed colored layers 8 and 9, thus preventing color mixing of the colored layers 8, 9, and 10.

As described above, the coloring liquid 2c of 1 μm in thickness is applied to the hydrophilic areas 6c. Thereafter, the coloring liquid 2c applied to the hydrophilic areas 6c is fired at 200° C. for 30 minutes. This forms the third colored layers 10 of blue (B) (FIG. 5(*g*)).

The above steps can provide the color filter substrate 1 being made up of the colored layers 8 of red (R), the colored layers 9 of green (G), and the colored layers 10 of blue (B) on the photocatalyst containing layer 5.

As described above, in the above method, since the colored layers (8 through 10) are formed with the coloring liquid 2 (2a through 2c) brought into contact with the photocatalyst containing layer 5, it is not necessary to position the areas where the coloring liquid 2 (2a through 2c) is to be applied (6a through 6c). Further, since the coloring liquid 2 (2a through 2c) is supplied continuously, unlike the ink jet technique, it is not necessary to control intermittent discharge of ink. This eliminates the need for a cumbersome manufacturing process and such an expensive manufacturing device as a device using the ink jet technique.

This makes it possible to manufacture the color filter substrate 1 simply and at low cost.

Since the coloring liquid (2a through 2c) is applied to the photocatalyst containing layer 5 while the coloring liquid (2a through 2c) is continuously brought into contact with the photocatalyst containing layer 5, that is, the coloring liquid (2a through 2c) is directly applied to the photocatalyst containing layer 5, the possibility that color unevenness and uncolored dots might occur in the colored layer (8 through 10) is reduced, as compared to the ink jet technique of coloring like pointillism (application of a coloring liquid).

This realizes the high-quality color filter substrate 1 to be manufactured. Moreover, this realizes reduction in the amount of coloring liquid (2a through 2c) used, as compared to the ink jet technique, thus reducing manufacturing costs.

Furthermore, according to this method, when coloring liquids (2a through 2c) of R, G, and B are applied, only the areas where the colored layers (8 through 10) are to be formed are the hydrophilic areas (6a through 6c), so that it is possible to reliably prevent the color mixing of the colored layers (8 through 10). In fact, as a result of observing the color filter substrate 1 thus fabricated by an optical microscope, any defects such as color mixing, color unevenness, uncolored dots were not observed.

Note that, apart from titanium oxide (for example, $TiO_2$) used in the present embodiment, examples of metal oxide dispersed in the photocatalyst containing layer include $SnO_2$, $ZnO$, $WO_3$, and $Fe_2O_3$.

Titanium oxide ($TiO_2$) is of a high band gap energy, chemically stable, and easily available. Titanium oxide ($TiO_2$) includes anatase-type titanium oxide and rutile-type titanium dioxide. The excitation wavelength of anatase-type titanium oxide is not more than 380 nm, and anatase-type titanium oxide has advantages such as excellent efficiencies of low-temperature firing and photocatalytic reaction.

Note that, in the step of forming the photocatalyst containing layer 5, the glass substrate (translucent substrate) 4 may be coated by any of various methods, not limited to spin coating, such as spray coating, dip coating, and bar coating.

Figure 6:
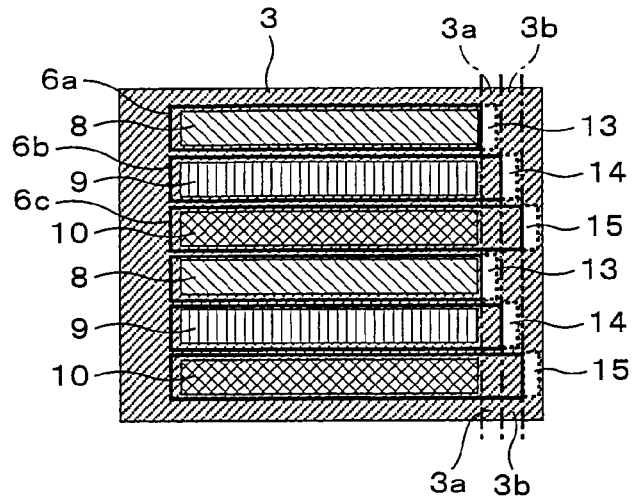
FIGS. 6(a)-(c) are process drawings illustrating an applying method of a coloring liquid in the present invention.
Figure 6:
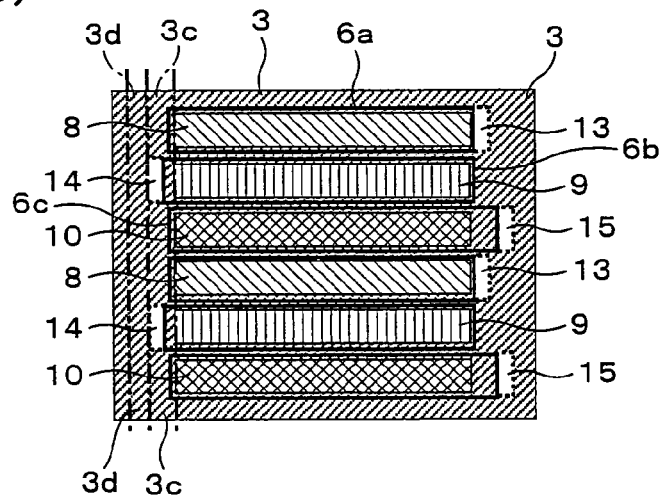
Figure 6:
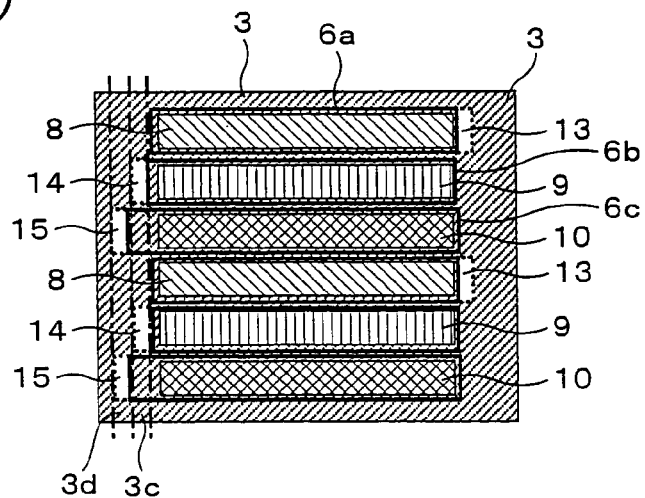

Note that, FIGS. 6(a)-(c) are plane views seen from a colored-layers forming surface side of the color filter substrate 1 in the present embodiment. Here, areas 13 (top ends of the hydrophilic areas 6a), areas 14 (top ends or bottom ends of the hydrophilic areas 6b), and areas 15 (top ends or bottom ends of the hydrophilic areas 6c) are on the black matrix 3 and are respective liquid-contacting positions of the nozzle end 24 (positions at which the application of coloring liquid is started) to form the first colored layer 8, the second colored layer 9, and the third colored layer 10.

As shown in FIG. 6(a), the areas 13 through 15 are located respectively at one ends of the hydrophilic areas 6a through 6c (on the side in the top end direction), and the area 14 is shifted in the top end direction more than the area 13, and the area 15 is shifted in the top end direction more than the area 14.

At this moment, when the coloring liquid 2b is brought into contact with the areas 14, the coloring liquid 2b does not bring into contact with the areas 13. Note that, at this moment, the areas 15 are hydrophobic areas because the hydrophilic areas 6c have not been formed yet. Therefore, when the coloring liquid 2b brings into contact with the areas 15, the coloring liquid 2b stays away from the areas 15 because the nozzle end 24 and the photocatalyst containing layer 5 (substrate surface) are separated by a certain distance before the applying step.

During the application to the hydrophilic areas 6b, the nozzle end 24 and the photocatalyst containing layer 5 (substrate surface) are separated in areas other than the hydrophilic areas 6b, as described above. Therefore, the coloring liquid 2b (G) to be applied to the hydrophilic areas 6b does not adhere to the surfaces of the already-formed colored layers 8, thus eliminating a color mixing.

Similarly, when the coloring liquid 2c is brought into contact with the areas 15, the coloring liquid 2c does not bring into contact with the areas 13 or the areas 14. Moreover, during the application to the hydrophilic areas 6c, the nozzle end 24 and the photocatalyst containing layer 5 (substrate surface) are separated in areas other than the hydrophilic areas 6c, as described above. Therefore, the coloring liquid 2c (B) to be applied to the hydrophilic areas 6c does not adhere to the surfaces of the colored layers 8 (R) and colored layers 9 (G) that have been already formed, thus eliminating color mixing.

However, the liquid-contacting position of the nozzle end 24 is not limited to these positions. That is, the liquid-contacting position of the nozzle end 24 may be any position provided that it does not overlap with the already-formed colored layers, and the arrangement shown in a plane view of FIG. 6(b) or FIG. 6(c) may be adopted.

That is, as shown in FIG. 6(b), the areas 13 and 15 are located at one ends of the line-shaped hydrophilic areas 6a and 6c (on the side in the top end direction), respectively. The area 15 is shifted in the top end direction more than the top end of the hydrophilic area 6b and the area 13. The area 14 may be located at the other end of the hydrophilic area 6b (on the side in the bottom end direction) and shifted in the bottom end direction more than the bottom ends of the hydrophilic area 6a and the hydrophilic area 6c.

In this case, when the coloring liquid 2b is brought into contact with the areas 14, the coloring liquid 2b does not bring into contact with the colored layers 8. Moreover, during the application to the hydrophilic areas 6b, the nozzle end 24 and the photocatalyst containing layer 5 (substrate surface) are separated, as described above. Therefore, the coloring liquid 2b does not adhere to the colored layers 8, thus eliminating color mixing.

When the coloring liquid 2c is brought into contact with the areas 15, the coloring liquid 2c does not bring into contact with the colored layers 8 or the colored layers 9. Moreover, during the application to the hydrophilic areas 6c, the nozzle end 24 and the photocatalyst containing layer 5 (substrate surface) are separated, as described above. Therefore, the coloring liquid 2c (B) does not adhere to the colored layers 8 (R) and the colored layers 9 (G), thus eliminating color mixing.

As shown in FIG. 6(c), the area 13 is located at one end of the hydrophilic area 6a (on the side in the top end direction). The area 13 may be shifted in the top end direction more than the top ends of the hydrophilic areas 6b and 6c. The areas 14 and 15 may be located at the other ends of the hydrophilic areas 6b and 6c (on the side in the bottom end direction). The area 14 may be shifted in the bottom end direction more than the bottom end of the hydrophilic area 6a. The area 15 may be shifted in the bottom end direction more than the area 14.

In this case, when the coloring liquid 2b is brought into contact with the areas 14, the coloring liquid 2b does not bring into contact with the colored layers 8. Moreover, during the application to the hydrophilic areas 6b, the nozzle end 24 and the photocatalyst containing layer 5 (substrate surface) are separated as described above. Therefore, the coloring liquid 2b does not adhere to the colored layers 8, thus eliminating color mixing.

When the coloring liquid 2c is brought into contact with the areas 15, the coloring liquid 2c does not bring into contact with the colored layers 8 or the colored layers 9. Moreover, during the application to the hydrophilic areas 6c, the nozzle end 24 and the photocatalyst containing layer 5 (substrate surface) are separated as described above. Therefore, the coloring liquid 2c (B) does not adhere to the colored layers 8 (R) and the colored layers 9 (G), thus eliminating color mixing.

As shown in FIG. 6(b), in forming the colored layers 9 (G), the coloring liquid 2b is brought into contact with the areas 14 on a black matrix area 3c opposite to a black matrix area 3a where the areas 13 are located, and at these positions the coloring liquid 2b is applied to the hydrophilic areas 6b. This avoids the coloring liquid 2b from being adhered to the already-formed colored layers 8, thus preventing color mixing between the colored layers.

Further, in forming the colored layers 10 (B), the coloring liquid 2c is brought into contact with the areas 15 on a black matrix area 3b, which is different from the black matrix areas 3a and 3c where the areas 13 and 14 exist, respectively, and at these positions the coloring liquid 2c is applied to the hydrophilic areas 6c. This avoids the coloring liquid 2c from being adhered to the already-formed colored layers 8 and 9, thus preventing color mixing between the colored layers.

Still further, as shown in FIG. 6(c), in forming the colored layers 10 (B), the coloring liquid 2c is brought into contact with the areas 15 on a black matrix area 3d, which is different from the black matrix areas 3a and 3c where the areas 13 and 14 exist, respectively, and at these positions, the coloring liquid 2c may be applied to the hydrophilic areas 6c.

In the above embodiment, when each type of the colored layers of R, G, B is formed, the patterning step has been performed. Alternatively, colored layers of several colors may be formed at once in a single patterning step. That is, it is possible to reduce the number of times the patterning step of exposing to ultraviolet irradiation via a photomask is performed. This will be described with reference to FIGS. 7(a)-(f) and FIG. 8. Here, FIGS. 7(a)-(f) show overall process of forming the colored layers, and FIG. 8 shows the contacting step and the applying step of the coloring liquid.

Figure 7:
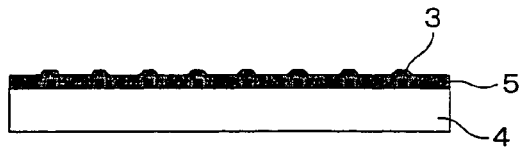
FIGS. 7(a)-(f) are process drawings illustrating a forming method of a colored layer in an embodiment of the present invention.
Figure 7:
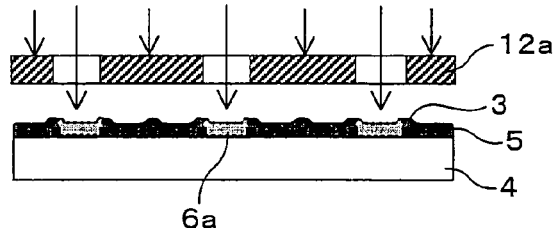
Figure 7:
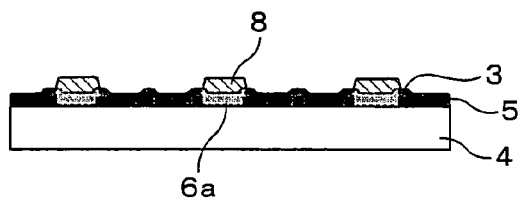
Figure 7:
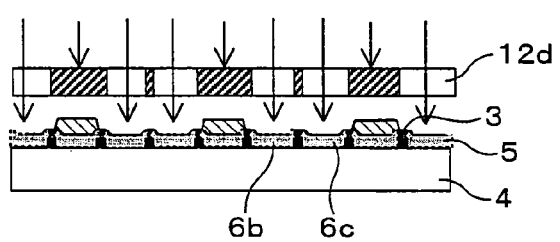
Figure 7:
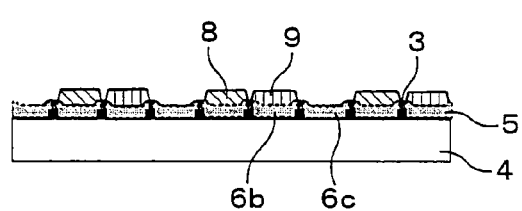
Figure 7:
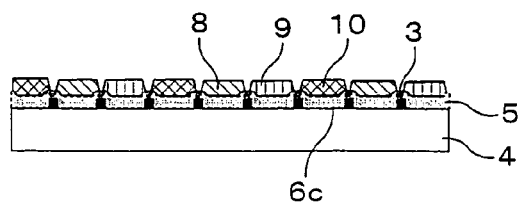
Figure 8:
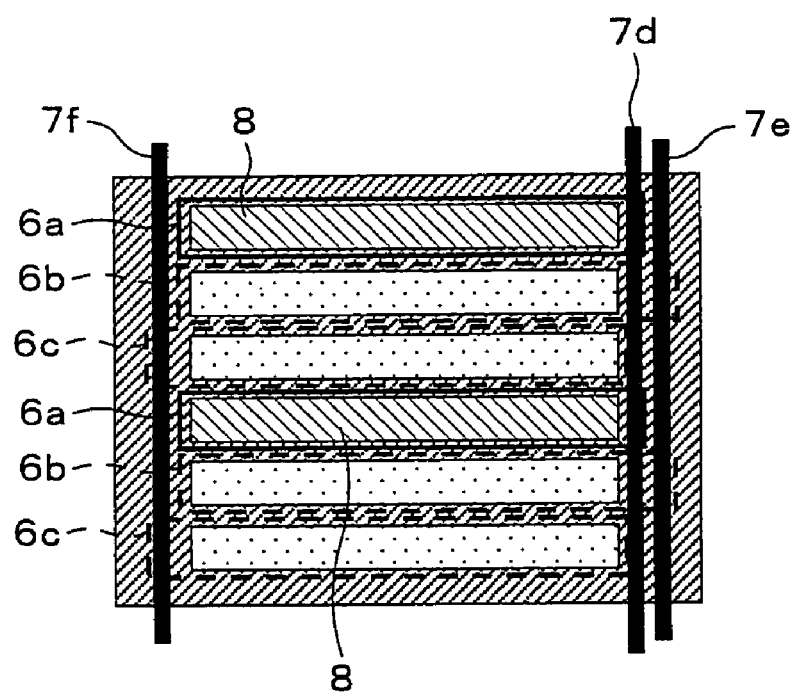
FIG. 8 is a process drawing illustrating an applying method of a coloring liquid in an embodiment of the present invention.

On the glass substrate 4 (on the glass substrate 4, the black matrix 3 is formed in a stripe pattern), the photocatalyst containing layer 5 is formed (see FIG. 7(a)).

Then, as shown in FIG. 7(b), the photocatalyst containing layer 5 is subjected to ultraviolet irradiation via the photomask 12a to form the hydrophilic areas 6a including locations where the first colored layers 8 are formed. Note that, the photomask 12a is patterned into a line form so that ultraviolet rays are irradiated to the hydrophilic areas 6a (areas surrounded by a black line in FIG. 8). This forms the line-shaped hydrophilic areas 6a and the hydrophobic areas on (the surface of) the photocatalyst containing layer 5.

Thereafter, using the application device shown in FIG. 2(a) and the applying method shown in FIGS. 1(a)-(c), the coloring liquid 2a (color resist including red (R) pigments in dispersion) of 1 µm in thickness is applied to the hydrophilic areas 6a. Here, when the nozzle end 24 is brought into contact with the ends of the hydrophilic areas 6b (see FIG. 1(a)), the nozzle end 24 is at a position denoted by 7d shown in FIG. 8.

Subsequently, the coloring liquid 2a applied to the hydrophilic areas 6a is fired at 200° C. for 30 minutes. This forms the first colored layers 8 of Red (R) (FIG. 7(c)).

Next, as shown in FIG. 7(d), the photocatalyst containing layer 5 is subjected to ultraviolet irradiation via a photomask 12d to simultaneously form the hydrophilic areas 6b and 6c including the locations where the second colored layer 9 and the third colored layer 10 are formed, respectively. Note that, the photomask 12d is patterned into a line form so that ultraviolet rays are irradiated to the hydrophilic areas 6b and 6c. This forms the hydrophilic areas 6b and 6c on the photocatalyst containing layer 5. Here, as shown in FIG. 8, the line-shaped hydrophilic areas 6b are so formed that their top ends are shifted more in the top end direction, as compared to the top ends of the hydrophilic areas 6a and 6c. Moreover, the line-shaped hydrophilic areas 6c are so formed that their bottom ends are shifted more in the bottom end direction, as compared to the bottom ends of the hydrophilic areas 6a and 6b.

Next, as in the case when the first colored layers 8 are formed, using the application device shown in FIG. 2(a) and the applying method shown in FIGS. 1(a)-(c), the coloring liquid 2b (color resist including green (G) pigments in dispersion) of 1 µm in thickness is applied only to the hydrophilic areas 6b. Here, when the nozzle end 24 is brought into contact with the ends of the hydrophilic areas 6b (see FIG. 1(a)), the nozzle end 24 is at a position denoted by 7e shown in FIG. 8. This avoids the coloring liquid 2b from being adhered to the already-formed colored layers 8, thus preventing color mixing between the colored layers.

As described above, the coloring liquid 2b of 1 µm in thickness is applied to the hydrophilic areas 6b. Thereafter, the coloring liquid 2b applied to the hydrophilic areas 6b is fired at 200° C. for 30 minutes. This forms the second colored layers 9 of green (G) (FIG. 7(e))

Next, as in the case when the first colored layer 8 and the second colored layer 9 are formed, using the application device shown in FIG. 2(a) and the application technique shown in FIGS. 1(a)-(c), a coloring liquid 2c (color resist including blue (B) pigments in dispersion) of 1 µm in thickness is applied only to the hydrophilic areas 6c. Here, when the nozzle end 24 brings into contact with the end of the hydrophilic area 6c (see FIG. 1(a)), the nozzle end 24 is at a position denoted by 7f shown in FIG. 8. This avoids the coloring liquid 2c from being adhered to the already-formed colored layers 8 and 9, thus preventing color mixing between the colored layers.

As described above, the coloring liquid 2c of 1 µm in thickness is applied to the hydrophilic areas 6c. Thereafter, the coloring liquid 2c applied to the hydrophilic areas 6c is fired at 200° C. for 30 minutes. This forms the third colored layers 10 of blue (B) (FIG. 7(f)).

The above steps can provide the color filter substrate 1 being made up of the colored layers 8 of red (R), the colored layers 9 of green (G), and the colored layers 10 of blue (B) on the photocatalyst containing layer 5.

Note that, 7d through 7f in FIG. 8 denote liquid-contacting positions of the nozzle end 24 (positions at which the application of a coloring liquid is started) in the present embodiment. 7d denotes a liquid-contacting position to the hydrophilic areas 6a. 7e denotes a liquid-contacting position to the hydrophilic areas 6b. 7f denotes a liquid-contacting position to the hydrophilic areas 6c.

Here, as described above, the hydrophilic area 6b is so formed that its top end is shifted more in the top end direction, as compared to the top ends of the hydrophilic areas 6a and 6c. Moreover, the hydrophilic area 6c is so formed that its bottom end is shifted more in the bottom end direction, as compared to the bottom ends of the hydrophilic areas 6a and 6b.

Here, as shown in FIG. 8, the liquid-contacting position 7e to the hydrophilic areas 6b is located at the top end side where the liquid-contacting position 7d to the hydrophilic areas 6a is also located. However, the liquid-contacting position 7e is shifted in the top end direction more than the liquid-contacting position 7d. Further, the liquid-contacting position 7f to the hydrophilic areas 6c is located on the opposite side of the liquid-contacting position 7d to the hydrophilic areas 6a and the liquid-contacting position 7e to the hydrophilic areas 6b (on the bottom end side of the hydrophilic areas 6a through 6c), and shifted in the bottom end direction more than the bottom ends of the hydrophilic areas 6a and 6b.

Consequently, when the coloring liquid 2b is brought into contact with the top end (7e) of the hydrophilic areas 6b, the coloring liquid 2b does not bring into contact with the colored layers 8 and the hydrophilic areas 6c. Moreover, during the application to the hydrophilic areas 6b, the nozzle end 24 and the photocatalyst containing layer 5 (substrate surface) are separated. Therefore, the coloring liquid 2b does not adhere to the colored layers 8 and the hydrophilic areas 6c, thus eliminating color mixing.

Further, when the coloring liquid 2c is brought into contact with the top end (7f) of the hydrophilic areas 6c, the coloring liquid 2c does not bring into contact with the colored layers 8 and 9. Moreover, during the application to the hydrophilic areas 6b, the nozzle end 24 and the photocatalyst containing layer 5 (substrate surface) are separated, as described above. Therefore, the coloring liquid 2c does not adhere to the colored layers 8 and 9, thus eliminating color mixing.

In addition, the hydrophilic areas 6b and 6c can be converted into hydrophilic areas at once, so that it is possible to reduce the number of times the patterning step is performed to twice. This results in simplification in the manufacturing process and reduction in the number of varieties of the photomask 12a used in the patterning step.

Note that the liquid-contacting positions 7d through 7f of the nozzle end 24 are not limited to these positions. That is, they may be any positions provided that a liquid-contacting position for a certain color does not overlap colored layers and hydrophilic areas of other color.

Further, in a single patterning step, the areas where the colored layers of all colors: red (R), green (G), and blue (B) are to be formed may be converted into hydrophilic areas. The coloring liquid 2 of 1 mm in thickness is applied to the hydrophilic areas for each color, and the coloring liquid 2 applied to the hydrophilic areas are fired at 200° C. for 30 minutes. By repeating these steps for each of the colors, the color filter substrate 1 being made up of the colored layers 8 of red (R), the colored layers 9 of green (G), and the colored layers 10 of blue (B) can be formed on the photocatalyst containing layer 5.

Although the application device 11 having a structure shown in FIG. 2(a) has been adopted in the present embodiment, the structure of the application device 11 is not limited to this. For example, as shown in FIG. 2(b), the application device 11 may have such a structure that the nozzle 22 is provided inside the liquid tank 21, and the coloring liquid 2 is directly supplied from the liquid tank 21 to the nozzle 22 (spacing 23), without using the supply pipe 25.

Further, although, water-based material showing hydrophilic property has been adopted for the coloring liquid 2 in the present embodiment, the coloring liquid 2 is not limited to this. For example, the coloring liquid 2 may be oil-based material showing lipophilic property.

In the case when a photocatalyst containing layer including titanium oxide or the like in dispersion is patterned, and then, hydrophilic areas and hydrophobic areas are formed on the photocatalyst containing layer, it is possible to remove the photocatalyst containing layer under the hydrophilic areas in such a manner that after the step of forming the hydrophilic areas and the hydrophobic areas, alkaline solution such as sodium hydroxide aqueous solution or potassium hydroxide aqueous solution is applied only to the hydrophilic areas.

As described above, a color filter substrate manufacturing method of the present invention is a color filter substrate manufacturing method of applying a coloring liquid to a substrate surface of a translucent substrate so as to form at least one colored layer, includes: contacting step of causing a coloring liquid supplied from a coloring liquid supplying section to bring into contact with areas showing lyophilic property to the coloring liquid and areas showing lyophobic property to the coloring liquid, the lyophilic areas and the lyophobic areas being formed on the substrate surface; and applying step of, after the contacting step, causing relative movement between the coloring liquid supplying section and the translucent substrate while continuously supplying a coloring liquid from the coloring liquid supplying section.

The above method is a method in which the coloring liquid is applied to the areas showing lyophilic property to the coloring liquid (hereinafter referred to as hydrophilic areas) and the areas showing lyophobic property to the coloring liquid (hereinafter referred to as hydrophobic areas), both of which are formed on the substrate surface, while the coloring liquid brings into contact with the both areas, that is, the coloring liquid is directly applied to the both areas. Here, lyophilic property indicates, for example, hydrophilic property and lipophilic property, and lyophobic property indicates, for example, hydrophobic property and lipophobic property.

That is, in the contacting step, when the coloring liquid is brought into contact with the substrate surface on which the lyophilic areas and the lyophobic areas are formed, the coloring liquid in contact with the lyophobic areas becomes in a repelled state on the surface of the lyophobic areas. On the other hand, the coloring liquid in contact with the lyophilic areas becomes in an adhered state to the surface of the lyophilic areas. In this state, in the applying step, relative movement is caused between the substrate surface and the coloring liquid supplying section while continuously supplying the coloring liquid from the coloring liquid supplying section. As a result of this, the coloring liquid supplied from the coloring liquid supplying section can be continuously applied only to the lyophilic areas.

Thus, in the above method, since the coloring liquid is applied to the substrate surface with the coloring liquid in contact with the substrate surface, it is not necessary to position areas where the coloring liquid is to be applied. Further, since the coloring liquid is continuously supplied from the coloring liquid supplying section, unlike the ink jet technique, it is not necessary to control intermittent discharge of ink. This eliminates the need for a cumbersome manufacturing process and such an expensive manufacturing device as a device using the ink jet technique.

This makes it possible to manufacture a color filter substrate simply and at low cost.

Moreover, since the coloring liquid is applied to the substrate surface (more precisely, the lyophilic areas to be colored) while the coloring liquid is continuously brought into contact with the substrate surface, that is, the coloring liquid is directly applied to the substrate surface, the possibility that color unevenness and uncolored dots might occur in the colored layer is reduced, as compared to the ink jet technique of coloring like pointillism (application of a coloring liquid).

This realizes a high-quality color filter substrate to be manufactured. Moreover, this realizes reduction in the amount of coloring liquid used, as compared to the ink jet technique, thus reducing manufacturing costs.

As described above, in the color filter substrate manufacturing method of the present invention, after the contacting step, the coloring liquid supplying section and the substrate surface are separated by a predetermined distance so that the coloring liquid stays away from the lyophobic areas while the coloring liquid is in contact with the lyophilic areas, thereafter performing the applying step.

Thus, after, in the contacting step, the coloring liquid supplied from the coloring liquid supplying section is brought into contact with the substrate surface on which the lyophilic areas and the lyophobic areas formed, whereby surface tension and other forces cause the coloring liquid to bring into contact with the lyophilic areas and to stay away from the lyophobic areas.

At this moment, the coloring liquid is kept adhered to the lyophilic areas while completely staying away (being draining off) from the lyophobic areas. Therefore, in this state, when relative movement is caused between the coloring liquid supplying section and the substrate surface, the coloring liquid can be reliably applied only to the areas where the coloring liquid is to be applied (lyophilic areas).

As described above, in the color filter substrate manufacturing method of the present invention, patterning step of forming the lyophilic areas and the lyophobic areas on the translucent substrate.

Thus, prior to the contacting step, the patterning step of forming the lyophilic areas and the lyophobic areas, whereby desired areas can be converted into lyophilic areas and lyophobic areas, and the coloring liquid can be applied to the desired areas.

As described above, in the color filter substrate manufacturing method of the present invention, after, as the patterning step for a predetermined color, line-shaped lyophilic areas corresponding to the predetermined color are formed, the contacting step and the applying step for the predetermined color are performed, and after, as the patterning step for a color different from the predetermined color, line-shaped lyophilic areas corresponding to the color different from the predetermined color are formed so that their top ends are shifted in a top end direction more than top ends of the lyophilic areas corresponding to the predetermined color, the contacting step is performed so that a coloring liquid of the color different from the predetermined color brings into contact with the top ends of the corresponding lyophilic areas, thereafter performing the applying step for the color different from the predetermined color, the patterning step, the contacting step, and the applying step in series being repeated at least once, thereby forming colored layers of multiple colors.

One end of the line-shaped lyophilic area is referred to as a top end of the lyophilic area.

According to the above method, since top ends of the lyophilic areas corresponding to a color different from the predetermined color are shifted in a top end direction more than top ends of the lyophilic areas corresponding to the predetermined color, in the contacting step for the color different from the predetermined color, a coloring liquid of the different color does not bring into contact with the lyophilic areas corresponding to the predetermined color.

Thus, colored layers of multiple colors are formed in such a manner so as to shift the top end positions of the line-shaped lyophilic areas respectively corresponding to the colors, thereby preventing color mixing of the multiple colors and facilitating the formation of colored layers with multiple colors.

Further, the color filter substrate manufacturing method of the present invention can be such that after, as the patterning step for a first color, line-shaped lyophilic areas corresponding to the first color are formed, the contacting step and the applying step for the first color are performed, after, as the patterning step for a second color, line-shaped lyophilic areas corresponding to the second color are formed so that their top ends are shifted in a top end direction more than top ends of the lyophilic areas corresponding to the first color, the contacting step for the second color is performed so that a coloring liquid of the second color brings into contact with the top ends of the corresponding lyophilic areas, thereafter performing the applying step for the second color, and after, as the patterning step for a third color, line-shaped lyophilic areas corresponding to the third color are formed so that their top-ends are shifted in a top end direction more than the top ends of the lyophilic areas corresponding to the second color, the contacting step for the third color is performed so that a coloring liquid of the third color brings into contact with the top ends of the corresponding lyophilic areas, thereafter performing the applying step for the third color, the steps in series being performed to form colored layers of three colors.

Further, in the color filter substrate manufacturing method of the present invention, after, as the patterning step for a first color, line-shaped lyophilic areas corresponding to the first color are formed, the contacting step and the applying step for the first color are performed, as the patterning step for second and third colors, line-shaped lyophilic areas corresponding to the second color are formed so that their top ends are shifted in a top end direction more than top ends of the lyophilic areas corresponding to the first color, and line-shaped lyophilic areas corresponding to the third color are formed so that their bottom ends are shifted in a bottom end direction more than bottom ends of the lyophilic areas respectively corresponding to the first and second colors and so that their top ends are shifted in a bottom end direction more than the top ends of the lyophilic areas corresponding to the second color, the contacting step for the second color is performed so that a coloring liquid for the second color brings into contact with the top ends of the corresponding lyophilic areas, thereafter performing the applying step for the second color, and the contacting step for the third color is performed so that a coloring liquid for the third color brings into contact with the bottom ends of the corresponding lyophilic areas, thereafter performing the applying step for the third color, the steps in series being performed to form colored layers of three colors.

One end of the line-shaped lyophilic area is referred to as a top end of the lyophilic area, and the other end of the line-shaped lyophilic area is referred to as a bottom end of the lyophilic area.

According to the above method, since the top ends of the lyophilic areas corresponding to the second color are shifted in the top end direction more than the top ends of the lyophilic areas corresponding to the first color, the coloring liquid of the second color does not bring into contact with the lyophilic areas corresponding to the first color (the coloring liquid of the first color that has been already applied) in the contacting step for the second color.

Moreover, since the top ends of the line-shaped lyophilic areas corresponding to the third color are shifted in the bottom end direction more than the top ends of the lyophilic areas corresponding to the second color, the coloring liquid of the second color does not bring into contact with the lyophilic areas corresponding to the third color in the contacting step for the second color.

Similarly, since the bottom ends of the lyophilic areas corresponding to the third color are shifted in the bottom end direction more than the bottom ends of the lyophilic areas respectively corresponding to the first and second colors, the coloring liquid of the third color does not bring into contact with the lyophilic areas respectively corresponding to the first and second colors (the coloring liquids of the first and second colors that have been already applied to the lyophilic areas) in the contacting step for the third color.

In the above method, the lyophilic areas corresponding to the second and third colors are patterned at once. This result in simplification in the patterning step and reduction in the number of varieties of photomasks and others used in the patterning step.

Thus, colored layers of multiple colors are formed in such a manner so as to shift the top end positions of the line-shaped lyophilic areas respectively corresponding to the colors, thereby preventing color mixing of the multiple colors and facilitating the formation of colored layers with multiple colors.

Further, in the color filter substrate manufacturing method of the present invention, in the patterning step, predetermined areas in a photocatalyst containing layer containing photocatalyst are exposed to light by using a photomask to convert the predetermined areas into lyophilic areas, the photocatalyst containing layer being formed on the substrate surface.

Still further, in the color filter substrate manufacturing method of the present invention, any one of $TiO_2$, $SnO_2$, $ZnO$, $WO_3$, and $Fe_2O_3$ is used for the photocatalyst.

As described above, it can be also said that a color filter substrate manufacturing method of the present invention is a color filter substrate manufacturing method of applying a coloring liquid to a substrate surface of a translucent substrate so as to form at least one colored layer, wherein included is applying step of applying the coloring liquid to the substrate surface in such a manner that a coloring liquid supply port for supplying the coloring liquid from a lower side of the translucent substrate is brought near the substrate surface on which lyophilic areas showing lyophilic property to the coloring liquid and lyophobic areas showing lyophobic property to the coloring liquid are formed so that a surface of the coloring liquid coming out from the coloring liquid supply port brings into contact with the substrate surface, and, in this state, relative movement is caused between the coloring liquid supply port and the translucent substrate while the coloring liquid is continuously supplied.

As described above, it can be also said that a color filter substrate manufacturing method of the present invention is a color filter substrate manufacturing method of applying a coloring liquid to a substrate surface of a translucent substrate so as to form at least one colored layer, wherein included is applying step of applying the coloring liquid to the substrate surface in such a manner that after a coloring liquid supply port for supplying the coloring liquid from a lower side of the translucent substrate is brought near the substrate surface on which lyophilic areas showing lyophilic property to the coloring liquid and lyophobic areas showing lyophobic property to the coloring liquid are formed so that a surface of the coloring liquid coming out from the coloring liquid supply port brings into contact with the substrate surface, the coloring liquid supply port and the substrate surface are separated so that the surface of the coloring liquid coming out from the coloring liquid supply port brings into contact only with the lyophilic areas, and relative movement is caused between the coloring liquid supply port and the translucent substrate with the surface of the coloring liquid in contact only with the lyophilic areas.

Further, it can be also said that a color filter substrate manufacturing method of the present invention is a color filter substrate manufacturing method of applying a coloring liquid to a substrate surface of a translucent substrate so as to form at least one colored layer, wherein included is applying step of applying the coloring liquid while the coloring liquid is continuously brought into contact with areas showing lyophilic property to the coloring liquid and areas showing lyophobic property to the coloring liquid, both of the areas being formed on the substrate surface.

The above method is a method in which the coloring liquid is directly applied to the areas showing lyophilic property to the coloring liquid (hereinafter referred to as hydrophilic areas) and the areas showing lyophobic property to the coloring liquid (hereinafter referred to as hydrophobic areas), both of which are formed on the substrate surface. Here, lyophilic property indicates, for example, hydrophilic property and lipophilic property, and lyophobic property indicates, for example, hydrophobic property and lipophobic property.

That is, when the coloring liquid is applied to the substrate surface, the coloring liquid in contact with the lyophobic areas becomes in a repelled state on the surface of the lyophobic areas. In this state, when the coloring liquid is applied continuously while the coloring liquid is supplied continuously, the coloring liquid does not adhere to the areas (lyophobic areas) other than the areas where the colored layer is to be formed.

Thus, in the above method, since the coloring liquid is applied to the substrate surface with the coloring liquid in contact with the substrate surface, it is not necessary to position areas where the coloring liquid is to be applied.

Further, since the coloring liquid is continuously supplied, unlike the ink jet technique, it is not necessary to control intermittent discharge of ink. This eliminates the need for a cumbersome manufacturing process and such an expensive manufacturing device as a device using the ink jet technique. This makes it possible to manufacture a color filter substrate simply and at low cost.

Moreover, since the coloring liquid is applied to the substrate surface (more precisely, the lyophilic areas to be colored) while the coloring liquid is continuously brought into contact with the substrate surface, that is, the coloring liquid is directly applied to the substrate surface, the possibility that color unevenness and uncolored dots might occur in the colored layer is reduced, as compared to the ink jet technique of coloring like pointillism (application of a coloring liquid). This realizes a high-quality color filter substrate to be manufactured. Moreover, this realizes reduction in the amount of coloring liquid used, as compared to the ink jet technique, thus reducing manufacturing costs.

As described above, in the color filter substrate manufacturing method of the present invention, it is desirable that the applying step includes the substeps of:

(a) causing a coloring liquid supply port of a coloring liquid supply device for supplying a coloring liquid to bring near a predetermined position of the substrate surface so that the coloring liquid is brought into contact with the predetermined position;

(b) separating by a predetermined distance between the coloring liquid supply port and the substrate surface so that the coloring liquid sags from the predetermined position by surface tension; and (c) causing relative movement between the coloring liquid supply port and the translucent substrate while keeping a predetermined distance between the coloring liquid supply port and the substrate surface, so as to apply the coloring liquid only to the areas showing lyophilic property to the coloring liquid.

In this method, in the first step, the coloring liquid supplied to the coloring liquid supply port of the coloring liquid supply device and raised by surface tension (exposed from the coloring liquid supply port to the outside) is brought into contact with a predetermined position of the substrate surface. At this moment, the coloring liquid in contact with the lyophobic areas becomes in repelled state on the surface of the lyophobic areas.

In the next step, the coloring liquid supply port is moved so that a certain distance is kept between the coloring liquid supply port and the substrate surface. The coloring liquid in contact with the lyophobic area is completely separated from the surface of the lyophobic area and stays away from the substrate surface. On the other hand, the coloring liquid in contact with the lyophilic areas sags by surface tension while being in contact with the lyophilic areas, which causes the coloring liquid supply port and the lyophilic area on the substrate surface (area to be colored) to be in a connected state with each other via the coloring liquid, with a certain distance maintained.

In the further next step, with this state maintained, the coloring liquid supply port or the translucent substrate is moved in parallel. This causes the coloring liquid to be applied only to the lyophilic areas (areas to be colored) formed on the translucent substrate.

Thus, it is possible to more accurately perform coloring of the areas to be colored by performing application of the coloring liquid with a certain distance kept between the coloring liquid supply port and the substrate surface and with areas (lyophobic areas) other than areas to be colored completely separated from the coloring liquid supply port. This makes it possible to prevent color mixing of the colored layers with a simple method.

As described above, in the color filter substrate manufacturing method of the present invention, it is desirable that by repeating the applying step at least three times, coloring liquids of three colors are applied on the substrate surface so as to form first colored layers, second colored layers, and third colored layers.

For example, it is a method of forming the lyophilic areas by forming on the substrate surface a lyophobic layer that develops lyophilic property upon ultraviolet irradiation (hereinafter referred to as photocatalyst containing layer) and exposing the photocatalyst containing layer to ultraviolet irradiation using a photomask with a predetermined pattern, and forming the colored layers of three colors in the order of the first colored layer, the second colored layer, and the third colored layer by performing a step of applying a desired coloring liquid only to this lyophilic area at least for three times.

Here, a photocatalyst material contained in the photocatalyst containing layer is a photosensitive metal oxide inherently having lyophobic property, such as $TiO_2$ (titanium oxide) and $SnO_2$ (tin oxide), and develops lyophilic property upon ultraviolet irradiation.

In the above method, the photocatalyst containing layer contains photocatalyst material inherently having lyophobic property and developing lyophilic property upon ultraviolet irradiation, so that the photocatalyst containing layer shows lyophobic property in the initial state where the photocatalyst containing layer is coated on the translucent substrate. Then, exposure of the photocatalyst containing layer to ultraviolet irradiation causes the reaction of excited and generated electrons and holes with oxygen and liquid, which are absorbed on the surface of the layer, to form active oxygen, thereby showing lyophilic property by surface modification.

With this principle, by exposure of the photocatalyst containing layer to ultraviolet irradiation via a photomask with a pattern of areas where the colored layer is desired to be formed, areas where the colored layer is desired to be formed in the photocatalyst containing layer are converted into lyophilic areas, and the other areas maintain showing lyophobic property in the initial state. Then, when a step of applying a desired coloring liquid to this lyophilic area is performed at least for three times, a color filter substrate can be manufactured.

That is, by exposure of the photocatalyst containing layer to ultraviolet irradiation using a photomask with a pattern of areas to be colored, the areas to be colored are converted into lyophilic areas. Then, desired colors should be applied to these lyophilic areas in order. For example, a coloring liquid of red is applied to the areas where a colored layer of red (R) is to be formed, a coloring liquid of green is then applied to the areas where a colored layer of green (G) is to be formed, and finally, a coloring liquid of blue is applied to the areas where a colored layer of blue (B) is to be formed. This makes it possible to form colored layers of three colors (for example, R, G, B).

Unlike the aforementioned dyeing method and other methods, the above method eliminates the need for repeating exposing and developing steps every time a colored layer of a different color is formed, and realizes simplification in a manufacturing process of color filter substrate.

Note that, if necessary, the arrangement described as the present invention may be arbitrarily combined with the arrangements previously described as the present invention.

As described above, in addition to the above method, in the color filter substrate manufacturing method of the present invention, it is desirable that in the above step, lyophilic areas are formed only in areas where the coloring liquids of three colors are to be applied on the substrate surface.

For example, the first colored layer, the second colored layer, and the third colored layer should be formed in the following manner: performing patterning of converting areas where the first colored layer are to be formed into lyophilic areas and applying a coloring liquid to the areas where the first colored layers are to be formed; performing patterning of converting areas where the second colored layers are to be formed into lyophilic areas and applying a coloring liquid to the areas where the second colored layers are to be formed; and performing patterning of converting areas where the third colored layers are to be formed into lyophilic areas and applying a coloring liquid to the areas where the third colored layers are to be formed.

The pattering herein is to convert the areas to be colored into lyophilic areas by exposure of the photocatalyst containing layer to ultraviolet irradiation via a photomask with a pattern of the areas to be colored.

The above method is a method in which for the formation of each of the first through third colored layers (for example, colored layer of red, colored layer of green, and colored layer of blue), formation (patterning) of lyophilic areas by exposure to ultraviolet irradiation and application of a coloring liquid to these lyophilic areas are performed.

For example, areas where the colored layers of red are to be formed are patterned, and a coloring liquid of red is applied to these areas. Next, areas where the colored layers of green are to be formed are patterned, and a coloring liquid of green is applied to these areas. Then, areas where the colored layers of blue are to be formed are patterned, and a coloring liquid of blue is applied to these areas.

According to this method, the areas where colored layers of each color are to be formed (only the areas where the coloring liquid of the color is to be applied) are lyophilic areas, so that when a coloring liquid of the color is applied, it is possible to reliably prevent color mixing of the colored layers.

Note that, if necessary, the arrangement described as the present invention may be arbitrarily combined with the arrangements previously described as the present invention.

As described above, in the color filter substrate manufacturing method of the present invention, in addition to the above method, it is desirable that the coloring liquid is brought into contact with a position where the colored layers are not formed on the substrate surface (photocatalyst containing layer).

The above method is related to the case when the subsequent colored layer is formed, assuming that there is the already-formed colored layer.

That is, the above method is a method in which the coloring liquid supplied to the coloring liquid supply port and raised by surface tension (exposed from the coloring liquid supply port to the outside) is brought into contact with a predetermined position on the photocatalyst containing layer, which is a position where the colored layers are not formed, so that the coloring liquid does not adhere to the already-formed colored layers.

With this method, without bringing into contact with the already-formed colored layer, the coloring liquid can be applied to the area where the subsequent colored layer is to be formed (lyophilic area), thus reliably preventing color mixing of colored layers.

Note that, if necessary, the arrangement described as the present invention may be arbitrarily combined with the arrangements previously described as the present invention.

As described above, in the color filter substrate manufacturing method of the present invention, it is desirable that when the second colored layers are formed, the coloring liquid is brought into contact with a position where the first colored layers are not formed.

With this method, without bringing into contact with the already-formed first colored layers, a desired coloring liquid can be applied to the areas where the second colored layers are to be formed (lyophilic areas), thus reliably preventing color mixing between the first colored layer and the second colored layer.

As described above, in the color filter substrate manufacturing method of the present invention, it is desirable that when the third colored layers are formed, the coloring liquid is brought into contact with a position where the first and second colored layers are not formed.

With this method, without bringing into contact with the already-formed first and second colored layers, a desired coloring liquid can be applied to the areas where the third colored layers are to be formed (lyophilic areas), thus reliably preventing color mixing of the first colored layer, the second colored layer, and the third colored layer.

Note that, if necessary, the arrangement described as the present invention may be arbitrarily combined with the arrangements previously described as the present invention.

Moreover, the color filter substrate manufacturing device of the present invention includes a nozzle for continuously supplying a coloring liquid to a predetermined area on a substrate surface of a translucent substrate. Further, the predetermined area includes areas showing lyophilic property and areas showing lyophobic property.

Further, in the color filter substrate manufacturing device of the present invention, it is desirable that the coloring liquid is continuously supplied to an end of the nozzle (nozzle end) by capillary phenomenon.

Here, the capillary phenomenon is a phenomenon that when a tube forming a capillary shape is inserted into a liquid, a liquid level in the tube becomes higher than a liquid level outside the tube.

The above arrangement is one that the coloring liquid led to the nozzle end by capillary phenomenon and exposed from the nozzle end by surface tension is directly applied to the substrate surface (photocatalyst containing layer) on which a pattern of lyophilic and lyophobic areas are formed.

With this arrangement, when application of the coloring liquid exposed from the nozzle end to the substrate surface causes decrease of the coloring liquid at the nozzle end, the approximate amount of decreased coloring liquid is automatically supplied to the nozzle end by capillary phenomenon. That is, without the need for a complicated device, the coloring liquid can be supplied continuously and stably to the nozzle end.

Therefore, in coloring (application of a coloring liquid), it is possible to easily prevent color unevenness and uncolored dots. Moreover, as compared to the ink jet technique, it is possible to reduce the amount of ink used.

Note that the nozzle end forms a groove shape.

Further, the nozzle is so arranged as to be capable of continuous relative movement with respect to the translucent substrate.

For a color filter substrate of the present invention, in applying a coloring liquid to a substrate surface of a translucent substrate so as to form at least one colored layer of the color filter substrate, used is a method of applying the coloring liquid while the coloring liquid is continuously brought into contact with areas showing lyophilic property to the coloring liquid and areas showing lyophobic property to the coloring liquid, both of the areas being formed on the substrate surface.

The present invention is not limited to the aforementioned embodiments and is susceptible of various changes within the scope of the accompanying claims. An embodiment obtained by suitable combinations of technical means disclosed in the different embodiments also fall within the technical scope of the present invention.

Specific embodiments or examples implemented in the description of the embodiments only show technical features of the present invention and are not intended to limit the scope of the invention. Variations can be effected within the spirit of the present invention and the scope of the following claims.

What is claimed is:

1. A color filter substrate manufacturing method of applying a coloring liquid to a substrate surface of a translucent substrate so as to form at least one colored layer, the color filter substrate manufacturing method comprising:

contacting step of causing a coloring liquid supplied from a coloring liquid supplying section to bring into contact with lyophilic areas showing lyophilic property to the coloring liquid and lyophobic areas showing lyophobic property to the coloring liquid, the lyophilic areas and the lyophobic areas being formed on the substrate surface; and applying step of, after the contacting step, causing relative movement between the coloring liquid supplying section and the translucent substrate while continuously supplying a coloring liquid from the coloring liquid supplying section.

2. The color filter substrate manufacturing method according to claim 1, wherein:

after the contacting step, the coloring liquid supplying section and the substrate surface are separated by a predetermined distance so that the coloring liquid stays away from the lyophobic areas while the coloring liquid is in contact with the lyophilic areas, thereafter performing the applying step.

3. The color filter substrate manufacturing method according to claim 2, further comprising:

patterning step of forming the lyophilic areas and the lyophobic areas on the translucent substrate.

4. The color filter substrate manufacturing method according to claim 3, wherein:

after, as the patterning step for a predetermined color, line-shaped lyophilic areas corresponding to the predetermined color are formed, the contacting step and the applying step for the predetermined color are performed, and after, as the patterning step for a color different from the predetermined color, line-shaped lyophilic areas corresponding to the color different from the predetermined color are formed so that their top ends are shifted in a top end direction more than top ends of the lyophilic areas corresponding to the predetermined color, the contacting step is performed so that a coloring liquid of the color different from the predetermined color brings into contact with the top ends of the corresponding lyophilic areas, thereafter performing the applying step for the color different from the predetermined color, the patterning step, the contacting step, and the applying step in series being repeated at least once, thereby forming colored layers of multiple colors.

5. The color filter substrate manufacturing method according to claim 3,
wherein:
after, as the patterning step for a first color, line-shaped lyophilic areas corresponding to the first color are formed, the contacting step and the applying step for the first color are performed,
after, as the patterning step for a second color, line-shaped lyophilic areas corresponding to the second color are formed so that their top ends are shifted in a top end direction more than top ends of the lyophilic areas corresponding to the first color, the contacting step for the second color is performed so that a coloring liquid of the second color brings into contact with the top ends of the corresponding lyophilic areas, thereafter performing the applying step for the second color, and
after, as the patterning step for a third color, line-shaped lyophilic areas corresponding to the third color are formed so that their top ends are shifted in a top end direction more than the top ends of the lyophilic areas corresponding to the second color, the contacting step for the third color is performed so that a coloring liquid of the third color brings into contact with the top ends of the corresponding lyophilic areas, thereafter performing the applying step for the third color,
the steps in series being performed to form colored layers of three colors.

6. The color filter substrate manufacturing method according to claim 3,
wherein:
after, as the patterning step for a first color, line-shaped lyophilic areas corresponding to the first color are formed, the contacting step and the applying step for the first color are performed,
as the patterning step for second and third colors, line-shaped lyophilic areas corresponding to the second color are formed so that their top ends are shifted in a top end direction more than top ends of the lyophilic areas corresponding to the first color, and line-shaped lyophilic areas corresponding to the third color are formed so that their bottom ends are shifted in a bottom end direction more than bottom ends of the lyophilic areas respectively corresponding to the first and second colors and so that their top ends are shifted in a bottom end direction more than the top ends of the lyophilic areas corresponding to the second color,
the contacting step for the second color is performed so that a coloring liquid for the second color brings into contact with the top ends of the corresponding lyophilic areas, thereafter performing the applying step for the second color, and
the contacting step for the third color is performed so that a coloring liquid for the third color brings into contact with the bottom ends of the corresponding lyophilic areas, thereafter performing the applying step for the third color,
the steps in series being performed to form colored layers of three colors.

7. The color filter substrate manufacturing method according to claim 3,
wherein:
in the patterning step, predetermined areas in a photocatalyst containing layer containing photocatalyst are exposed to light by using a photomask to convert the predetermined areas into lyophilic areas, the photocatalyst containing layer being formed on the substrate surface.

8. The color filter substrate manufacturing method according to claim 7,
wherein:
any one of $TiO_2$, $SnO_2$, $ZnO$, $WO_3$, and $Fe_2O_3$ is used for the photocatalyst.

9. A color filter substrate manufacturing method of applying a coloring liquid to a substrate surface of a translucent substrate so as to form at least one colored layer,
wherein:
included is applying step of applying the coloring liquid to the substrate surface in such a manner that a coloring liquid supply port for supplying the coloring liquid from a lower side of the translucent substrate is brought near the substrate surface on which lyophilic areas showing lyophilic property to the coloring liquid and lyophobic areas showing lyophobic property to the coloring liquid are formed so that a surface of the coloring liquid coming out from the coloring liquid supply port brings into contact with the substrate surface, and, in this state, relative movement is caused between the coloring liquid supply port and the translucent substrate while the coloring liquid is continuously supplied.

10. A color filter substrate manufacturing method of applying a coloring liquid to a substrate surface of a translucent substrate so as to form at least one colored layer,
wherein:
included is applying step of applying the coloring liquid to the substrate surface in such a manner that after a coloring liquid supply port supplying for the coloring liquid from a lower side of the translucent substrate is brought near the substrate surface on which lyophilic areas showing lyophilic property to the coloring liquid and lyophobic areas showing lyophobic property to the coloring liquid are formed so that a surface of the coloring liquid coming out from the coloring liquid supply port brings into contact with the substrate surface, the coloring liquid supply port and the substrate surface are separated so that the surface of the coloring liquid coming out from the coloring liquid supply port brings into contact only with the lyophilic areas, and relative movement is caused between the coloring liquid supply port and the translucent substrate with the surface of the coloring liquid in contact only with the lyophilic areas.

11. A color filter substrate manufacturing method of applying a coloring liquid to a substrate surface of a translucent substrate so as to form at least one colored layer,
wherein:
included is applying step of applying the coloring liquid while the coloring liquid is continuously brought into contact with areas showing lyophilic property to the coloring liquid and areas showing lyophobic property to the coloring liquid, both of the areas being formed on the substrate surface.

12. The color filter substrate manufacturing method according to claim 11,
wherein:
the applying step includes the substeps of:
(a) causing a coloring liquid supply port of a coloring liquid supply device for supplying a coloring liquid to bring near a predetermined position of the substrate surface so that the coloring liquid is brought into contact with the predetermined position;

(b) separating by a predetermined distance between the coloring liquid supply port and the substrate surface so that the coloring liquid sags from the predetermined position by surface tension; and (c) causing relative movement between the coloring liquid supply port and the translucent substrate while keeping a predetermined distance between the coloring liquid supply port and the substrate surface, so as to apply the coloring liquid only to the areas showing lyophilic property to the coloring liquid.

13. The color filter substrate manufacturing method according to claim 11, wherein:

by repeating the applying step at least three times, coloring liquids of three colors are applied on the substrate surface so as to form first colored layers, second colored layers, and third colored layers.

14. The color filter substrate manufacturing method according to claim 13, wherein:

lyophilic areas are formed only in areas where the coloring liquids of three colors are to be applied on the substrate surface.

15. The color filter substrate manufacturing method according to claim 12, wherein:

the coloring liquid is brought into contact with a position where the colored layers are not formed on the substrate surface.

16. The color filter substrate manufacturing method according to claim 13, wherein:

when the second colored layers are formed, the coloring liquid is brought into contact with a position where the first colored layers are not formed.

17. The color filter substrate manufacturing method according to claim 13, wherein:

when the third colored layers are formed, the coloring liquid is brought into contact with a position where the first and second colored layers are not formed.

* * * * *